United States Patent
Hogstrom et al.

(10) Patent No.: US 7,533,365 B1
(45) Date of Patent: May 12, 2009

(54) DEVELOPMENT SYSTEM WITH METHODOLOGY FOR RUN-TIME RESTORATION OF UML MODEL FROM PROGRAM CODE

(75) Inventors: Jonas Hogstrom, Hagersten (SE); Anders Ivner, Linkoping (SE); Jan Norden, Saffle (SE)

(73) Assignee: Borland Software Corporation, Austin, TX (US)

( * ) Notice: Subject to any disclaimer, the term of this patent is extended or adjusted under 35 U.S.C. 154(b) by 794 days.

(21) Appl. No.: 10/708,021

(22) Filed: Feb. 3, 2004

(51) Int. Cl.
*G06F 9/44* (2006.01)
*G06F 9/45* (2006.01)

(52) U.S. Cl. .............. 717/105; 717/104; 717/106; 717/140

(58) Field of Classification Search ......... 717/104–113, 717/140
See application file for complete search history.

(56) References Cited

U.S. PATENT DOCUMENTS

| | | | |
|---|---|---|---|
| 6,018,627 A | 1/2000 | Iyengar et al. | 717/103 |
| 6,038,393 A | 3/2000 | Iyengar et al. | 717/104 |
| 6,170,081 B1 | 1/2001 | Fontana et al. | 717/104 |
| 6,199,195 B1 | 3/2001 | Goodwin et al. | 717/104 |
| 6,253,366 B1 | 6/2001 | Mutschler | 717/104 |
| 6,269,473 B1 * | 7/2001 | Freed et al. | 717/104 |
| 6,292,932 B1 | 9/2001 | Baisley et al. | 717/114 |
| 6,330,527 B1 | 12/2001 | Jung et al. | 703/22 |
| 6,330,569 B1 | 12/2001 | Baisley et al. | 707/203 |
| 6,381,743 B1 | 4/2002 | Mutschler | 717/104 |
| 6,405,361 B1 | 6/2002 | Broy et al. | 717/104 |
| 6,408,311 B1 | 6/2002 | Baisley et al. | 707/203 |
| 6,415,275 B1 | 7/2002 | Zahn | 706/47 |
| 6,502,239 B2 * | 12/2002 | Zgarba et al. | 717/168 |
| 6,560,769 B1 | 5/2003 | Moore et al. | 717/100 |
| 6,681,383 B1 * | 1/2004 | Pastor et al. | 717/126 |
| 6,684,386 B1 | 1/2004 | Baisley | 717/114 |
| 6,694,508 B1 | 2/2004 | Moore et al. | 717/121 |
| 6,701,381 B2 * | 3/2004 | Hearne et al. | 717/104 |
| 6,701,517 B1 | 3/2004 | Moore et al. | 717/121 |
| 6,711,734 B1 | 3/2004 | Baisley | 717/104 |
| 6,711,735 B1 | 3/2004 | Rioux et al. | 717/137 |
| 6,804,686 B1 | 10/2004 | Stone et al. | 707/104.1 |
| 6,807,583 B2 | 10/2004 | Hrischuk et al. | 719/318 |

(Continued)

OTHER PUBLICATIONS

Kobryn, Cris, "Modeling Components and Frameworks With UML," 2000, ACM, p. 31-38.*

(Continued)

*Primary Examiner*—Wei Y Zhen
*Assistant Examiner*—Qing Chen
(74) *Attorney, Agent, or Firm*—Kokka & Backus, PC

(57) ABSTRACT

A development system with methodology for run-time restoration of UML model from program code is described. In one embodiment, for example, in a computer system, an improved method is described for developing and executing an application, the method comprises steps of: creating a model describing business objects and rules of the application; creating source code for the application, including representing the model within the source code itself; compiling the source code into an executable application; running the executable application on a target computer in conjunction with a run-time framework that provides services to the executable application; and while the executable application is running, reconstructing the model from the executable application and making it available to the run-time framework.

60 Claims, 12 Drawing Sheets

U.S. PATENT DOCUMENTS

| | | | |
|---|---|---|---|
| 6,851,107 B1* | 2/2005 | Coad et al. | 717/108 |
| 6,874,146 B1 | 3/2005 | Iyengar | 719/313 |
| 6,907,564 B1 | 6/2005 | Burchhardt et al. | 715/513 |
| 6,917,937 B1 | 7/2005 | Rubendall | 707/5 |
| 6,986,120 B2 | 1/2006 | Reddy et al. | 717/104 |
| 7,000,219 B2* | 2/2006 | Barrett et al. | 717/107 |
| 7,032,210 B2* | 4/2006 | Alloing et al. | 717/106 |
| 7,035,860 B2 | 4/2006 | Poole et al. | 707/100 |
| 7,043,481 B2 | 5/2006 | Mullins et al. | 707/10 |
| 7,047,518 B2 | 5/2006 | Little et al. | 717/108 |
| 7,103,600 B2* | 9/2006 | Mullins | 707/10 |
| 7,162,462 B1* | 1/2007 | Mutschler, III | 706/47 |
| 2002/0184401 A1* | 12/2002 | Kadel et al. | 709/315 |
| 2004/0031015 A1* | 2/2004 | Ben-Romdhane et al. | 717/107 |
| 2004/0034846 A1* | 2/2004 | Ortal et al. | 717/111 |
| 2004/0044990 A1* | 3/2004 | Schloegel et al. | 717/113 |
| 2005/0071803 A1* | 3/2005 | Cherdron et al. | 717/101 |
| 2005/0071805 A1* | 3/2005 | Lauterbach et al. | 717/107 |

OTHER PUBLICATIONS

Riehle et al., "The Architecture of a UML Virtual Machine," 2001, ACM, p. 327-341.*

Medvidovic et al., "Modeling Software Architectures in the Unified Modeling Language," 2002, ACM, p. 2-57.*

Kodase et al., "Transforming Structural Model to Runtime Model of Embedded Software with Real-Time Constraints," 2003, IEEE, p. 1-6.*

Harrison et al., "Mapping UML Designs to Java™," Oct. 2000, ACM, p. 178-188.*

OMG, OMG Unified Modeling Language Specification, Version 1.5, Chapters 1 (all) and 2 (Background), pp. 1-69, Mar. 2003.

* cited by examiner

```
namespace Project41
{
    [UmlElement("Package")]
    [UmlMetaAttribute("ownedElement", typeof(Person))]
    [UmlMetaAttribute("ownedElement", typeof(Building))]
    public abstract class CoreClassesPackage
    {
    }
    [UmlElement]
    public class Person : object, ILoopBack {

[EcoAutoGenerated]
        public class PersonListAdapter : ObjectListAdapter, IPersonList  [...]

Autogenerated ECO code

[EcoAutoMaintained]
        public Person(IEcoServiceProvider serviceProvider)  [...]
    }
    [UmlElement]
    public class Building : object, ILoopBack {

[EcoAutoGenerated]
        public class BuildingListAdapter : ObjectListAdapter, IBuildingList  [...]

Autogenerated ECO code

[EcoAutoMaintained]
        public Building(IEcoServiceProvider serviceProvider)  [...]
    }
    [UmlCollection(typeof(Person))][EcoAutoGenerated]
    public interface IPersonList  [...]
    [UmlCollection(typeof(Building))][EcoAutoGenerated]
    public interface IBuildingList  [...]
}
```

```
{
    [UmlElement("Package")]
    [UmlMetaAttribute("ownedElement", typeof(Person))]
    [UmlMetaAttribute("ownedElement", typeof(Building))]
    public abstract class CoreClassesPackage
    {
        [UmlElement("Association")]                              333
        public class Residency {
        }
    }
    [UmlElement]
    public class Person : object, ILoopBack {
        [EcoAutoGenerated]
        public class PersonListAdapter : ObjectListAdapter, IPersonList [...]
        Autogenerated ECO code
        [EcoAutoMaintained]
        public Person(IEcoServiceProvider serviceProvider) [...]
        [UmlElement(Index=(Person.PersonFirstMember + 0))]
        [EcoAutoMaintained]
        public string firstName [...]
        [UmlElement(Index=(Person.PersonFirstMember + 1))]
        [EcoAutoMaintained]
        public string lastName [...]
        [UmlElement(Index=(Person.PersonFirstMember + 2))]
        [EcoAutoMaintained]
        [UmlTaggedValue("derived", "true")]
        [UmlTaggedValue("Eco.DerivationOCL", "firstName + \' \' + lastName")]
        public string fullName [...]
        [UmlElement("AssociationEnd", Index=(Person.PersonFirstMember + 3))]
        [EcoAutoMaintained]
        [UmlMetaAttribute("association", typeof(CoreClassesPackage.Residency), Index=1)]
        [UmlMetaAttribute("multiplicity", "0..1")]
        public Building home [...]
    }
    [UmlElement]
    public class Building : object, ILoopBack {
        [EcoAutoGenerated]
        public class BuildingListAdapter : ObjectListAdapter, IBuildingList [...]
        Autogenerated ECO code
        [EcoAutoMaintained]
        public Building(IEcoServiceProvider serviceProvider) [...]
        [UmlElement("AssociationEnd", Index=(Building.BuildingFirstMember + 0))]
        [EcoAutoMaintained]
        [UmlMetaAttribute("association", typeof(CoreClassesPackage.Residency), Index=0)]
        [UmlMetaAttribute("multiplicity", "0..*")]
        public IPersonList resident {
            get {
                // If you add user code here, please remove the [EcoAutoMaintained] attribute
                return new Project41.Person.PersonListAdapter(this._resident);
            }
        }
    }
}
```

*FIG. 3F*

DEVELOPMENT SYSTEM WITH METHODOLOGY FOR RUN-TIME RESTORATION OF UML MODEL FROM PROGRAM CODE

COPYRIGHT STATEMENT

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

APPENDIX DATA

Computer Program Listing Appendix under Sec. 1.52(e): This application includes a transmittal under 37 C.F.R. Sec. 1.52(e) of a Computer Program Listing Appendix. The Appendix, which comprises text file(s) that are IBM-PC machine and Microsoft Windows Operating System compatible, includes the below-listed file(s). All of the material disclosed in the Computer Program Listing Appendix can be found at the U.S. Patent and Trademark Office archives and is hereby incorporated by reference into the present application.

Object Description: SourceCode.txt, size: 4 KB, created: Feb. 3, 2004 1:14 PM; Object ID: File No. 1; Object Contents: Source Code.

Object Description: SampleApp.txt, size: 15508 Bytes, created: May 23, 2007 2:27:24 PM; Object ID: File No. 2; Object Contents: Source code.

BACKGROUND OF INVENTION

1. Field of the Invention

The present invention relates generally to a system providing methods for facilitating development and maintenance of software programs or systems, with particular emphasis on techniques that allow model information, such as Unified Modeling Language (UML) model information, to be moved into a program's run-time environment by means of source code—that is, to bring the entire model into code-representable elements.

2. Description of the Background Art

Before a digital computer may accomplish a desired task, it must receive an appropriate set of instructions. Executed by the computer's microprocessor, these instructions, collectively referred to as a "computer program," direct the operation of the computer. Expectedly, the computer must understand the instructions which it receives before it may undertake the specified activity.

Owing to their digital nature, computers essentially only understand "machine code," i.e., the low-level, minute instructions for performing specific tasks—the sequence of ones and zeros that are interpreted as specific instructions by the computer's microprocessor. Since machine language or machine code is the only language computers actually understand, all other programming languages represent ways of structuring human language so that humans can get computers to perform specific tasks. While it is possible for humans to compose meaningful programs in machine code, practically all software development today employs one or more of the available programming languages. The most widely used programming languages are the "high-level" languages, such as C, C++, Pascal, or more recently Java® and C#. These languages allow data structures and algorithms to be expressed in a style of writing that is easily read and understood by fellow programmers.

A program called a "compiler" translates these instructions into the requisite machine language. In the context of this translation, the program written in the high-level language is called the "source code" or source program. The ultimate output of the compiler is a compiled module such as a compiled C "object module", which includes instructions for execution ultimately by a target processor, or a compiled Java® class, which includes bytecodes for execution ultimately by a Java® virtual machine. A Java® compiler generates platform-neutral "bytecodes", an architecturally neutral, intermediate format designed for deploying application code efficiently to multiple platforms.

"Visual" development environments, such as Borland's JBuilder® or Borland's C# Builder™, are the preferred application development environments for quickly creating production applications. Such environments are characterized by an integrated development environment (IDE) providing a form painter, a property getter/setter manager ("inspector"), a project manager, a tool palette (with objects which the user can drag and drop on forms), an editor, and a compiler. In general operation, the user "paints" objects on one or more forms, using the form painter. Attributes and properties of the objects on the forms can be modified using the property manager or inspector. In conjunction with this operation, the user attaches or associates program code with particular objects on screen (e.g., button objects); the editor is used to edit program code which has been attached to particular objects. After the program code has been developed, the compiler is used to generate binary code for execution on a machine (e.g., Intel native machine code for execution on Intel-compatible microprocessors or Java® bytecode for execution on a Java® virtual machine).

Although visual development environments enable applications to be created quickly, problems remain with the development, implementation, and maintenance of software applications. One problem is that modern software applications are increasingly complex. In an object-oriented development environment, software applications are developed as a set of objects and classes that interact with one another. It is difficult for developers to use those objects and classes unless they fully understand the relationships between them. For example, to change the name of a method in a java application a developer has to find all classes that invoke the method, so that the invocations of the method are updated accordingly. All told, application developers and other users are required to understand complex relationships between components of software systems in order to develop, implement, and maintain such systems.

Various approaches have been made to assist users in handling this increased complexity. A current technology for understanding complex object-oriented software systems is the Unified Modeling Language (UML). UML is a standard graphical language for modeling object-oriented systems. For further information on UML, see e.g., "OMG Unified Modeling Language Specification (Version 1.5, March 2003)" available from the Object Management Group, Inc., the disclosure of which is hereby incorporated by reference. A copy of this specification is available via the Internet (e.g., currently at (www)omg.org). UML, at its simplest, is a language that graphically describes a set of elements. At its most complex, UML is used to specify, visualize, construct, and document not only software systems but also business models and non-software systems. Much like a blueprint for constructing a building, UML provides a graphical representation of a system design that may be used by developers to assure architectural soundness of a system. UML is frequently used to design the relationships between components (e.g., classes in the case of a Java program) before such components are developed and implemented in source code format. For example, UML class diagrams allow the structure of a system to be specified in a language-neutral fashion, without involvement in all of the various implementation details such as persistence, business domain implementation, and technical behavior of the system.

A number of UML design tools are available for use in conjunction with the design and development of a software system. However, there is a large gap between a UML class model and a running application, primarily due to the lack of implementation details in a UML class model as well as the fact that to date no compiler has been written that consumes "pure" UML models. Current UML design tools are focused on system design and are not well integrated with the source code program that is ultimately created. In those systems, the model that is created a design time (design artifact) has no direct code representation. Typically a developer uses a UML design tool for program design but then after initial design of the model is complete, the developer ceases to evolve the model into a better design. This is because present-day UML design tools and development tools are not well integrated. In particular, the UML diagrams that are created to model one's program are not reflected in the program's code as it executes at run time. Although one may attempt to place the design artifacts in "comments" to source code (i.e., source code comments, which represent text ignored by the compiler) or in a proprietary format, those attempts of course omit the model information from the code that is actually compiled into the application. Therefore, they do not provide a means for allowing model information to be reachable at run time via the application's own compiled code.

There are several possible ways to address this gap between a UML model and a running application that is implemented based on the model. The traditional approach has been for the developer to look at the UML model and use it as "inspiration" during the implementation phase. However, this traditional approach is subject to the limitations described above. Another possible approach is to generate code for implementing the model based on the structural information and certain specified technical behavior. This approach may, however, be difficult to effectively implement and also does not ensure that the model can be restored at run time. A preferred approach is to use the UML model information as meta data for a run-time framework. However, in this case, the problem that then arises is how to move the information expressed in the UML model into the run-time framework.

What is needed is a solution that allows model information, such as UML model information, to be moved into a program's run-time environment by means of source code. The present invention fulfills these and other needs.

SUMMARY OF INVENTION

A development system with methodology for run-time restoration of UML model from program code is described. In one embodiment, for example, in a computer system, an improved method of the present invention is described for developing and executing an application, the method comprises steps of: creating a model describing business objects and rules of the application; creating source code for the application, including representing the model within the source code itself; compiling the source code into an executable application; running the executable application on a target computer in conjunction with a run-time framework that provides services to the executable application; and while the executable application is running, reconstructing the model from the executable application and making it available to the run-time framework.

In another embodiment, for example, in a computer system, an improved system of the present invention is described for developing and executing an application, the system comprises: a modeling tool for creating a model describing business objects and rules of the application; a module for creating source code for the application and representing the model within the source code itself; a compiler for compiling the source code into an executable application; and a run-time framework that is able to reconstruct the model from the executable application and use it for providing services.

In yet another embodiment, for example, a method of the present invention is described for developing and executing an application on a computer system, the method comprises steps of: creating a model for developing an application using Unified Modeling Language (UML) technique; generating source code to implement the model; amending the source code for storing model information in the source code; compiling the amended source code into an executable application and running the executable application on the computer system; reconstructing the model from the executable application; and making the reconstructed model available for supporting operation of the executable application.

BRIEF DESCRIPTION OF DRAWINGS

FIGS. 3A-F comprise bitmap screenshots illustrating an exemplary user interface for creating a model.

DETAILED DESCRIPTION

Glossary

Figure 1:
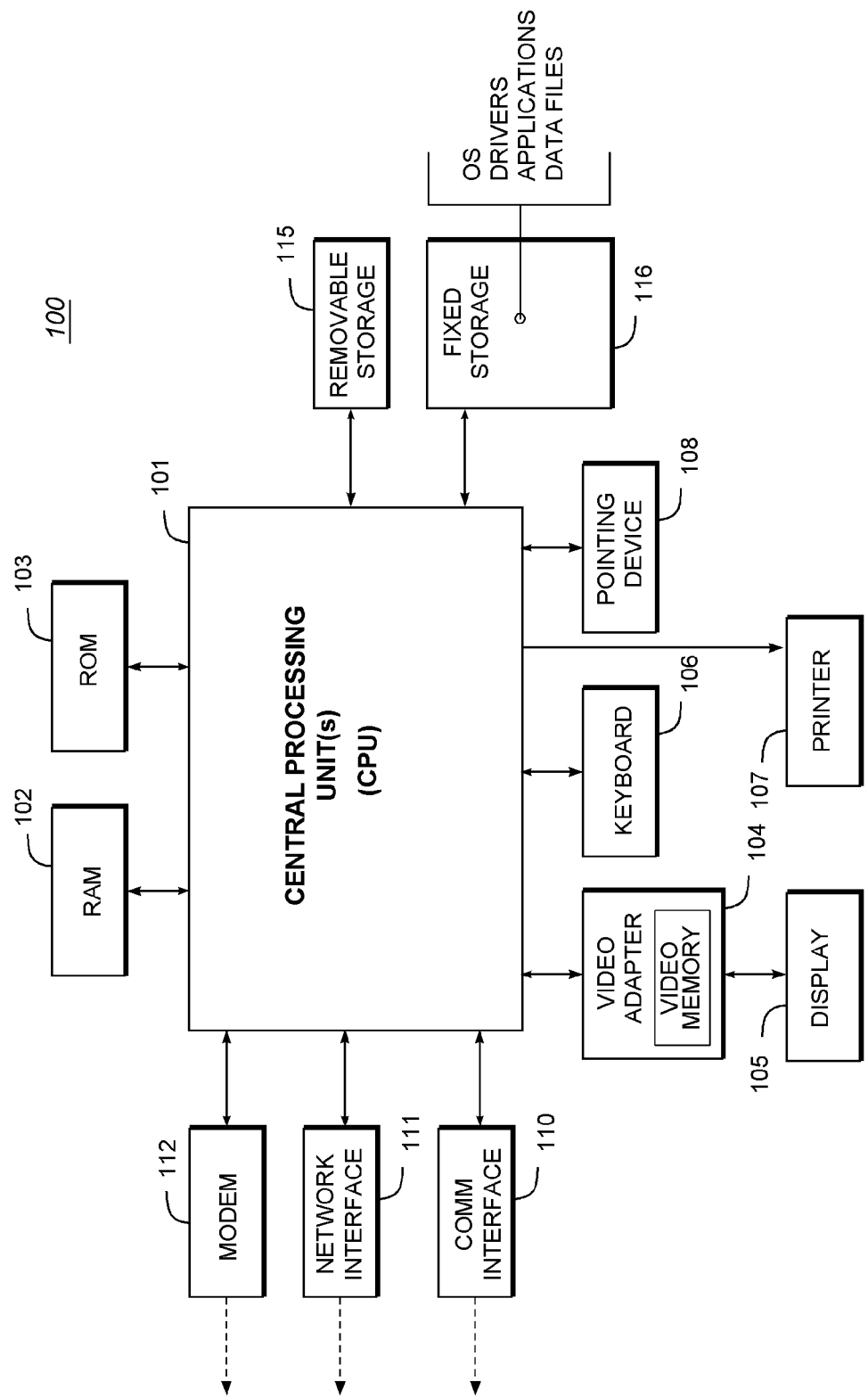
FIG. 1 is a very general block diagram of a computer system (e.g., an IBM-compatible system) in which software-implemented processes of the present invention may be embodied.

The following definitions are offered for purposes of illustration, not limitation, in order to assist with understanding the discussion that follows.

Compiler: A program that translates source code into object code.

Introspection: Studying a component or run-time code with reflection (see below) to discover its properties; for example, one may study a Java "bean" component using the Java Reflection API to discover its properties.

Linker: A program that combines object code modules to form an executable program, including replacing symbolic addresses with real addresses.

Microsoft® .NET: A Microsoft platform that incorporates applications and a suite of tools and services.

Microsoft® .NET Framework: A collection of classes implemented on top of a CLR (Common Language Runtime) system providing containers, strings, components, interfaces, streams, and user interface control classes for use by programmers writing applications to run in the .NET execution environment (the .NET platform).

OCL: Object Constraint Language, which has been part of UML since its inception, is used to express computational systems by declarative rules that a given system's behavior should conform to.

Packages: Refers to a collection of development modules, such as Java packages (e.g., .jar files) or C# packages (e.g., files from .NET framework).

Reflection: This is a feature of attribute-based programming that allows an application to query its own meta data. Reflection allows an application to discover information about itself so that it may display this information to the user, modify its own behavior by using late-binding and dynamic invocation (i.e., binding to and calling methods at run time), or create new data types at run time. In Java, for example, a Java Reflection API is provided that enables Java code to discover information about the fields, methods, and constructors of loaded (in-memory) classes, and to use reflected fields, methods, and constructors to operate on their underlying counterparts on objects, within security restrictions. The Java Reflection API accommodates applications that need access to either the public members of a target object (based on its run-time class) or the members declared by a given class.

UML: UML standards for the Unified Modeling Language, a standard graphical language for modeling object-oriented systems. For further information on UML, see e.g., "OMG Unified Modeling Language Specification (Version 1.5, March 2003)" available from the Object Management Group, Inc., the disclosure of which is hereby incorporated by reference. A copy of this specification is available via the Internet (e.g., currently at (www)omg.org).

Referring to the figures, exemplary embodiments of the invention will now be described. The following description will focus on the presently preferred embodiment of the present invention, which is implemented in desktop and/or server software (e.g., driver, application, or the like) operating in an Internet-connected environment running under an operating system, such as the Microsoft Windows® operating system. The present invention, however, is not limited to any one particular application or any particular environment. Instead, those skilled in the art will find that the system and methods of the present invention may be advantageously embodied on a variety of different platforms, including Macintosh®, Linux®, Solaris™, UNIX®, FreeBSD®, and the like. Further, implementation of the present invention does not require Internet connectivity. Therefore, the description of the exemplary embodiments that follows is for purposes of illustration and not limitation. The exemplary embodiments are primarily described with reference to block diagrams or flowcharts. As to the flowcharts, each block within the flowcharts represents both a method step and an apparatus element for performing the method step. Depending upon the implementation, the corresponding apparatus element may be configured in hardware, software, firmware or combinations thereof.

Computer-Based Implementation

Basic System Hardware (e.g., for Desktop and Server Computers)

The present invention may be implemented on a conventional or general-purpose computer system, such as an IBM-compatible personal computer (PC) or server computer. FIG. 1 is a very general block diagram of a computer system (e.g., an IBM-compatible system) in which software-implemented processes of the present invention may be embodied. As shown, system 100 comprises a central processing unit(s) (CPU) or processor(s) 101 coupled to a random-access memory (RAM) 102, a read-only memory (ROM) 103, a keyboard 106, a printer 107, a pointing device 108, a display or video adapter 104 connected to a display device 105, a removable (mass) storage device 115 (e.g., floppy disk, CD-ROM, CD-R, CD-RW, DVD, or the like), a fixed (mass) storage device 116 (e.g., hard disk), a communication (COMM) port(s) or interface(s) 110, a modem 112, and a network interface card (NIC) or controller 111 (e.g., Ethernet). Although not shown separately, a real time system clock is included with the system 100, in a conventional manner.

CPU 101 comprises a processor of the Intel Pentium® family of microprocessors. However, any other suitable processor may be utilized for implementing the present invention. The CPU 101 communicates with other components of the system via a bi-directional system bus (including any necessary input/output (I/O) controller circuitry and other "glue" logic). The bus, which includes address lines for addressing system memory, provides data transfer between and among the various components. Description of Pentium-class microprocessors and their instruction set, bus architecture, and control lines is available from Intel Corporation of Santa Clara, Calif. Random-access memory 102 serves as the working memory for the CPU 101. In a typical configuration, RAM of sixty-four megabytes or more is employed. More or less memory may be used without departing from the scope of the present invention. The read-only memory (ROM) 103 contains the basic input/output system code (BIOS)—a set of low-level routines in the ROM that application programs and the operating systems can use to interact with the hardware, including reading characters from the keyboard, outputting characters to printers, and so forth.

Mass storage devices 115, 116 provide persistent storage on fixed and removable media, such as magnetic, optical or magnetic-optical storage systems, flash memory, or any other available mass storage technology. The mass storage may be shared on a network, or it may be a dedicated mass storage. As shown in FIG. 1, fixed storage 116 stores a body of program and data for directing operation of the computer system, including an operating system, user application programs, driver and other support files, as well as other data files of all sorts. Typically, the fixed storage 116 serves as the main hard disk for the system.

In basic operation, program logic (including that which implements methodology of the present invention described below) is loaded from the removable storage 115 or fixed storage 116 into the main (RAM) memory 102, for execution by the CPU 101. During operation of the program logic, the system 100 accepts user input from a keyboard 106 and pointing device 108, as well as speech-based input from a voice recognition system (not shown). The keyboard 106 permits selection of application programs, entry of keyboard-based input or data, and selection and manipulation of individual data objects displayed on the screen or display device 105. Likewise, the pointing device 108, such as a mouse, track ball, pen device, or the like, permits selection and manipulation of objects on the display device. In this manner, these input devices support manual user input for any process running on the system.

The computer system 100 displays text and/or graphic images and other data on the display device 105. The video adapter 104, which is interposed between the display 105 and the system's bus, drives the display device 105. The video adapter 104, which includes video memory accessible to the CPU 101, provides circuitry that converts pixel data stored in the video memory to a raster signal suitable for use by a cathode ray tube (CRT) raster or liquid crystal display (LCD) monitor. A hard copy of the displayed information, or other information within the system 100, may be obtained from the printer 107, or other output device. Printer 107 may include, for instance, an HP LaserJet® printer (available from Hewlett-Packard of Palo Alto, Calif.), for creating hard copy images of output of the system.

The system itself communicates with other devices (e.g., other computers) via the network interface card (NIC) 111 connected to a network (e.g., Ethernet network, Bluetooth® wireless network, or the like), and/or modem 112 (e.g., 56K baud, ISDN, DSL, or cable modem), examples of which are available from 3Com of Santa Clara, Calif. The system 100 may also communicate with local occasionally-connected devices (e.g., serial cable-linked devices) via the communication (COMM) interface 110, which may include a RS-232 serial port, a Universal Serial Bus (USB) interface, or the like. Devices that will be commonly connected locally to the interface 110 include laptop computers, handheld organizers, digital cameras, and the like.

IBM-compatible personal computers and server computers are available from a variety of vendors. Representative vendors include Dell Computers of Round Rock, Tex., Hewlett-Packard of Palo Alto, Calif., and IBM of Armonk, N.Y. Other suitable computers include Apple-compatible computers (e.g., Macintosh®), which are available from Apple Computer of Cupertino, Calif., and Sun Solaris™ workstations, which are available from Sun Microsystems of Mountain View, Calif.

Basic System Software

Figure 2:
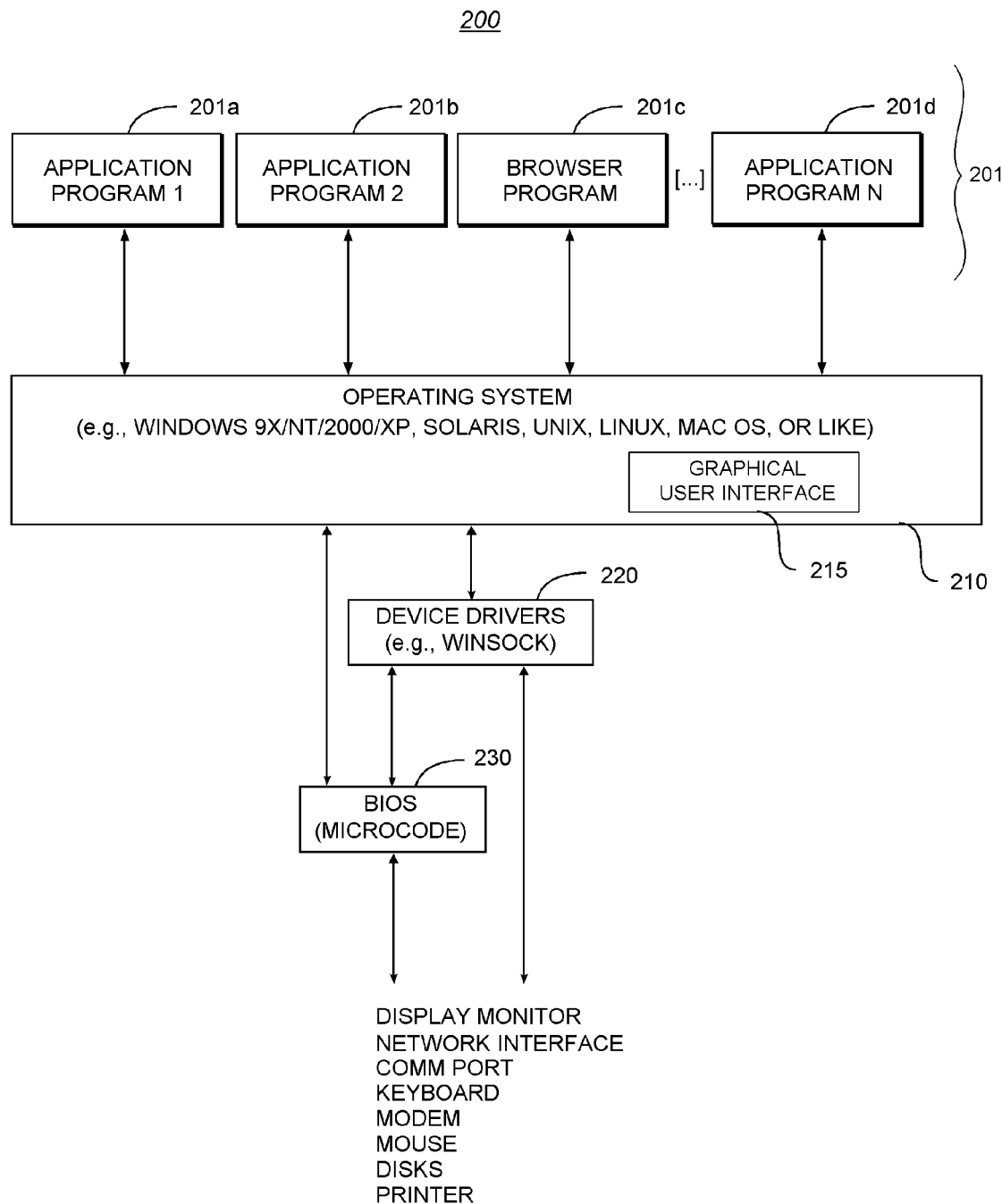
FIG. 2 is a block diagram of a software system for controlling the operation of the computer system.

FIG. 2 is a block diagram of a software system for controlling the operation of the computer system 100. As shown, a computer software system 200 is provided for directing the operation of the computer system 100. Software system 200, which is stored in system memory (RAM) 102 and on fixed storage (e.g., hard disk) 116, includes a kernel or operating system (OS) 210. The OS 210 manages low-level aspects of computer operation, including managing execution of processes, memory allocation, file input and output (I/O), and device I/O. One or more application programs, such as client application software or "programs" 201 (e.g., 201a, 201b, 201c, 201d) may be "loaded" (i.e., transferred from fixed storage 116 into memory 102) for execution by the system 100. The applications or other software intended for use on the computer system 100 may also be stored as a set of down-loadable computer-executable instructions, for example, for downloading and installation from an Internet location (e.g., Web server).

Software system 200 includes a graphical user interface (GUI) 215, for receiving user commands and data in a graphical (e.g., "point-and-click") fashion. These inputs, in turn, may be acted upon by the system 100 in accordance with instructions from operating system 210, and/or client application module(s) 201. The GUI 215 also serves to display the results of operation from the OS 210 and application(s) 201, whereupon the user may supply additional inputs or terminate the session. Typically, the OS 210 operates in conjunction with device drivers 220 (e.g., "Winsock" driver—Windows' implementation of a TCP/IP stack) and the system BIOS microcode 230 (i.e., ROM-based microcode), particularly when interfacing with peripheral devices. OS 210 can be provided by a conventional operating system, such as Microsoft Windows® 9x, Microsoft Windows® NT, Microsoft Windows® 2000, or Microsoft Windows® XP, all available from Microsoft Corporation of Redmond, Wash. Alternatively, OS 210 can also be an alternative operating system, such as the previously mentioned operating systems.

The above-described computer hardware and software are presented for purposes of illustrating the basic underlying computer components, such as desktop and server computers, that may be employed for implementing the present invention. For purposes of discussion, the following description will present examples in which it will be assumed that there exists at least one computer system (whether desktop or server) for operating the computer-implemented methods described below. The present invention, however, is not limited to any particular computer or device configuration. Indeed, the present invention may be implemented in any type of system architecture or processing environment capable of supporting the methodologies of the present invention presented in detail below.

Moving Modeling Information into the Run-Time Environment

Introduction to Model Driven Architecture

The present invention is currently embodied in a development system marketed under the commercial name Enterprise Core Objects™ that supports application development through a model-driven architecture (MDA). The MDA is based on an application model described using the Unified Modeling Language (UML). The basic technique allows an application designer to specify a program's architecture by defining a model comprising a list of classes, inheritance, properties, relationships between classes, and constraints. The primary objective of modeling is to organize and visualize the structure and components of software-intensive systems. Models visually represent requirements, subsystems, logical and physical elements, and structural and behavioral patterns.

Use of modeling for software development may be introduced by way of example. Consider the programming task of creating an invoice system. Here, one's application business logic is first defined using UML. For example, the developer may first create an object class that models a customer—that is, a person who is buying something. To model this in an object-oriented system, for instance, one might define a "person" class to represent the customer and an "invoice" class to represent invoices for a given customer. Each invoice in turn may be associated with one or more invoice "line items."

Consider the task of querying a person (person object) for a list of invoices (one or more invoice objects) that pertain to the person. For a transient system (i.e., one without persistent or externalized storage), the information about invoices must be entered into the system in the same session in which the information is requested. For a persistent system (i.e., one with externalized storage such as a backend SQL database) given the same task of querying a person object for a list of invoices, the system must first make sure that the invoices exist for the given person and can be loaded from the database. The backend database itself comprises tables, with each table comprising one or more columns (attributes) of information. In an object-oriented world, the task of retrieving the invoices for a given person is typically manifested through SQL statements to a backend SQL database. The returned result set is then moved into objects, thereby creating a list of invoices for a given person.

The development system provides a model-driven run-time framework where the above task is reduced down to the programmer simply writing the syntax (code):

person.invoices

In response, the run-time framework undertakes all the necessary work for generating appropriate SQL statements for retrieving data from a backend SQL database that may be moved into corresponding objects—that is, objects corresponding to the business rules and objects being modeled (such as person/customer and invoices). In this example, the run-time framework recognizes that "invoices" corresponds to persistently-stored information that can be retrieved (e.g., invoice information that can be retrieved from an Invoice table of a backend database via SQL statements). Thus, the run-time framework automatically generates appropriate SQL statements and the returned data (result sets, potentially from a variety of tables) is automatically moved into the corresponding objects (e.g., invoice data moved into a list of invoice objects for a given person/customer). In this manner, the application developer need not think about where data is coming from and where it is stored.

The run-time framework also automatically manages the persistent storage (e.g., backend database). For instance, if the person (object) in the example above is deleted, the then-current object data is inconsistent with the information stored in the backend database. In effect, the run-time system at that point is "dirty." The framework therefore includes functionality to maintain consistency between the object model and the persistently stored data.

In UML, one can specify a relation or association that is an aggregation—that is, a containment. The framework may detect this from the model and use this to enforce consistency. For example, if a car object is defined or modeled to include wheels, deletion of the car in the system will also lead to deletion of the (contained) wheels (since according to the model the wheels cannot exist without the car). While the foregoing example corresponds to a cascading delete in SQL databases, it is important to note that the relation in the example is defined at the level of the model. Thus, the framework is able to automatically maintain consistency between the object data and backend data (e.g., the data in the backend database), including issuing automatically-generated SQL statements to achieve consistency, based on relations specified in the model.

In addition to the foregoing run-time operation, the framework assumes responsibility at the outset for creating an underlying database schema for a given model. The framework also stores enough information in the schema that it allows the programmer to evolve the schema during development, such as allowing one to make model changes between programming sessions (e.g., add ZIP code to address, remove middle name from person). The framework includes functionality to determine what SQL statements are necessary for the framework to issue in order to effect the appropriate backend database changes to reflect the newly evolved model. Additionally, the framework assumes responsibility for moving data as required to maintain consistency between run-time objects and backend data.

Further description of the basic use of modeling may be found, for example, in Borland C# Builder™ version 1.0. It is available from Borland Software Corporation of Scotts Valley, Calif. The discussion which follows will focus on those features of the system that are relevant to understanding the present invention's approach of allowing model information, such as UML model information, to be moved into a program's run-time environment by means of source code.

Overview of Preferred Embodiment

A model-driven run-time framework is employed for embodying the present invention. The framework uses data provided from a modeling tool as input, much like a compiler uses source code. Given the "run-time" framework, the information from the modeling tool must be transported into the run-time framework by some means. One way to do this is via auxiliary files, which are employed at run time as carriers of information. However, that approach is not desirable since having two versions of information (i.e., model information in UML and source code information) is problematic: the potential for version conflict is high. That approach may also require separate tools to view the model. Further, that approach may make it difficult to visually certify that the correct model data is brought into the run-time environment. Given that the structure expressed in code needs to match the structure expressed in the model (i.e., remain synchronized), a better solution is sought.

In accordance with the present invention, a new means is provided to store model information (e.g., UML information) in the source code. The present invention provides a means to amend source code to allow inclusion of information in a UML class diagram. Some of this information is expressed as language constructs. Other information is expressed as additional specifiers to structural code elements ("Attributes") or as code artifacts with the express purpose of carrying or grouping model information. The foregoing features operate in conjunction with an engine that—at application run time—can span an entire model by means of introspection and restore the information found in the original class diagram. This set of information is subsequently fed into the run-time framework, for supporting run-time operation of the application.

Structural information is primarily represented as "normal" source code, and elements that do not have an implementation language representation are stored as "code attributes." The basic operations which occur are as follows. First, the user creates a model for the application under development (e.g., using UML modeling language/technique). This model is provided as input to the development system which, in response, generates source code to fully represent the model. This model information is accessed at run time as follows. When the run-time framework requires the model information from the compiled application, the compiled application is inspected using introspection/reflection mechanisms (e.g., .NET introspection/reflection). In a .NET embodiment, for example, the information may be represented in code using "decorated classes" (e.g., via .NET attributes) to ensure that all aspects of a UML model are representable in code. Based on run-time inspection of this representation, the run-time framework may re-create an internal UML-based model at run time. In other words, the system is able to represent model artifacts in a manner that is reachable by introspection/reflection at run time, thereby allowing the model to be reconstructed at run time for consumption by the framework (as well as being available to introspection by user code). In the currently preferred embodiment, this internal model representation is cached to optimize performance. During run time, the framework may employ the internal model representation for providing run-time services that support the business rules and objects specified for the application (during model creation).

By moving the information contained in the design time model (a design artifact) into the run-time framework (i.e., by constructing a new structure representing the model of the application), the present invention allows the model representation (design artifact) to remain synchronized with the source code representation. Additionally, the approach achieves a connection between business objects/rules (i.e., user written classes that address a domain/business problem for end users) and a model driven run-time framework—and does so by means other than inheritance. Also, the approach does not require a separate file (e.g., auxiliary file) for distribution, nor does the approach require any other tool for inspection of the model information that goes into the application. Here, the proximity between the code and model—both in terms of physical location and structure definition reuse—makes synchronization easier; the code can easily be read and rendered in a modeling tool. Since the model may be fully represented in the code that is used to compile the application, the model can be restored at run time and used for supporting/implementing the business objects and rules specified (in the model) for the application.

Design Surface

Files, Diagrams and Packages

For a given development project, the corresponding model is partitioned into packages, as per the UML definition. Each package corresponds to a source file (e.g., .cs file) containing the code for the classes contained in the package. Each package also has one default diagram. It contains all the classes defined in the package. It may also show classes from other packages. There may be additional diagrams showing any subset of classes available in any of the files (packages) in the project. If desired, one may add model elements that exist in assemblies only (i.e., not in source code) to a diagram. For obvious reasons those would be read-only.

IDE Integration

For properties and tagged values that are expressions, such as initial values, constraints, and derivation expressions, the existing property editor in the development environment's IDE launches an Object Constraint Language (OCL) editor. The editor for tagged values should preferably support enumerations (enums), large text fields, and OCL expressions. A "tree view" may be provided that shows all available classes nested in their packages, and attributes, methods, and association ends, which are nested in their classes.

Exemplary User Interface

Creating a Model

FIGS. 3A-F comprise bitmap screenshots illustrating an exemplary user interface for creating a model. The development system of the present invention provides an model design tool having an interface 300, shown in FIG. 3A, for visually designing a model. As shown in the initial model 301 in the figure, two classes are created: Person and Building. The UML view of the model contents are seen in the tree view 303 to the right and the class diagram 305 in the center of the figure. The diagramming tool functions primarily to act as a graphical input mechanism when specifying models, and to generate source code equivalent of the specified model.

FIG. 3B shows a portion of the initial code 311 generated in response to the model 301. The code snippet shows the important parts of the code as a function of the model. The attributes appear in brackets, for example [UmlElement("Package")], which indicates the class CoreClassesPackage is a UML element of the type Package. This code element has no representation in the model, but is added for the sole purpose of creating the model artifact of a package. The [UmlElement] attribute on class Person and class Building indicate these two classes are "Uml Elements," which receive special treatment when reconstructing the model at run time. Similarly, [UmlCollection(typeof(Person))] is an indicator that IPersonList is indeed a "Uml Collection" able to store collections of items of the type Person.

Figure 3A:
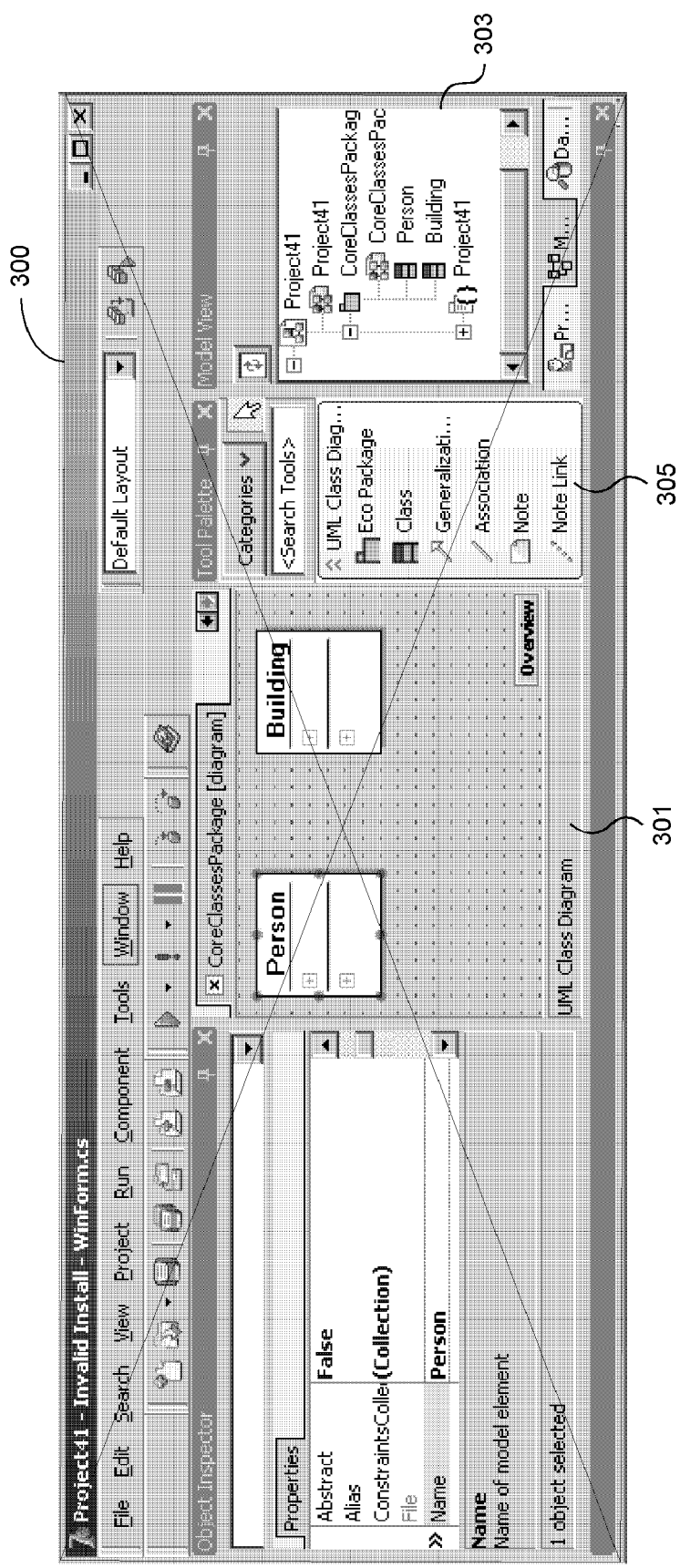
Figure 3C:
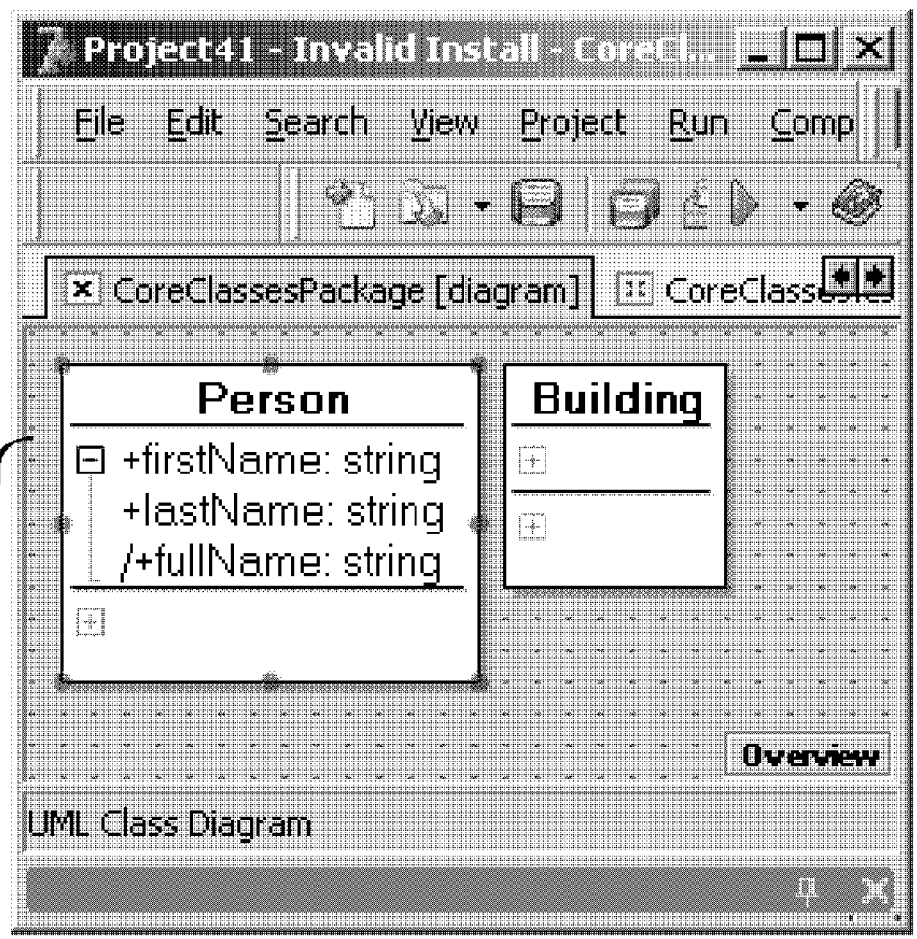
Figure 3D:
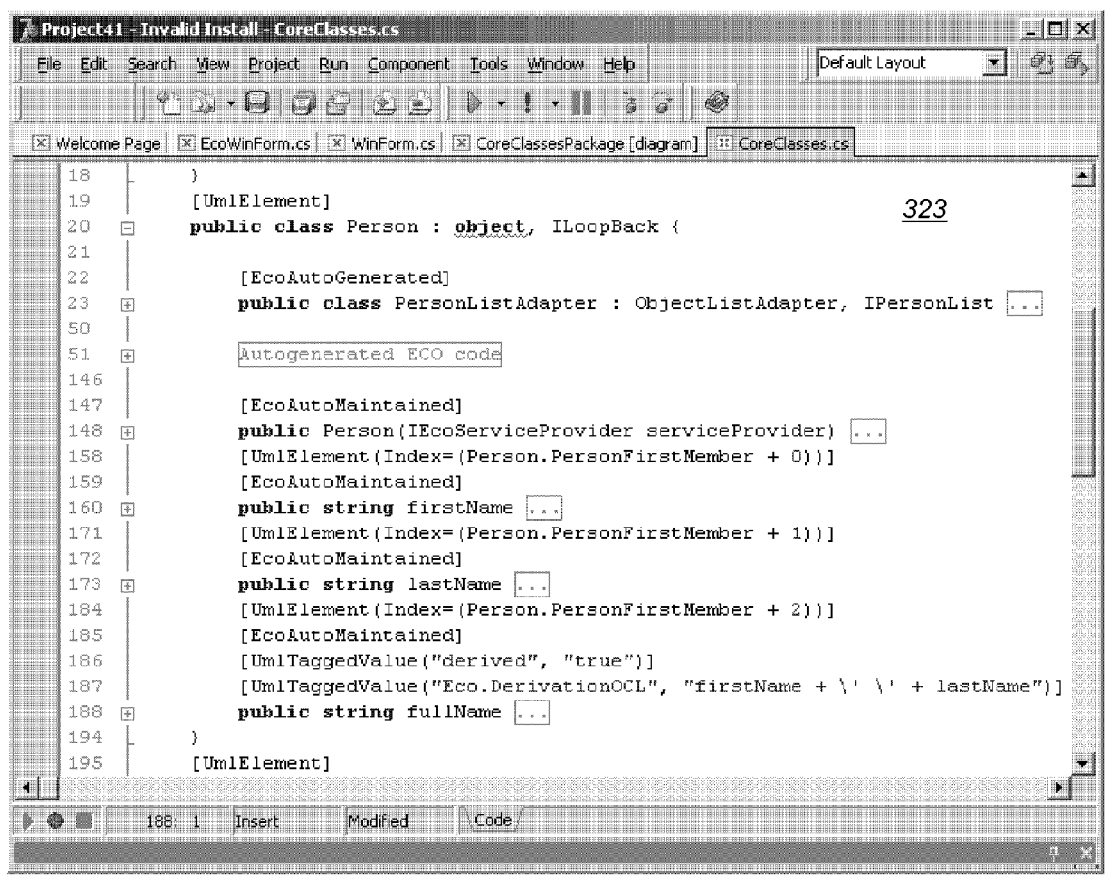

FIG. 3C illustrates the updated model, now shown as model 321. Here the Person class is amended with UML-type properties, namely firstName, lastName, and the derived attribute fullName. FIG. 3D illustrates the updated code, now shown as code 323. As shown, the generated code now includes the above mentioned properties (in FIG. 3C). Of interest is [UmlElement(Index=(Person.PersonFirstMember+0))]. This indicates that the property is a UML property and indicates its position within the defining class. Of particular interest is the pair [UmlTaggedValue("derived", "true")] and [UmlTaggedValue("Eco.DerivationOCL", "firstName+\'\'+lastName")], which represents an attribute that conveys meta information not expressible by code. It specifies that the property is a derived value (i.e., synthesized from existing information) and also specifies the formula used to derive/synthesize this value.

Figure 3E:
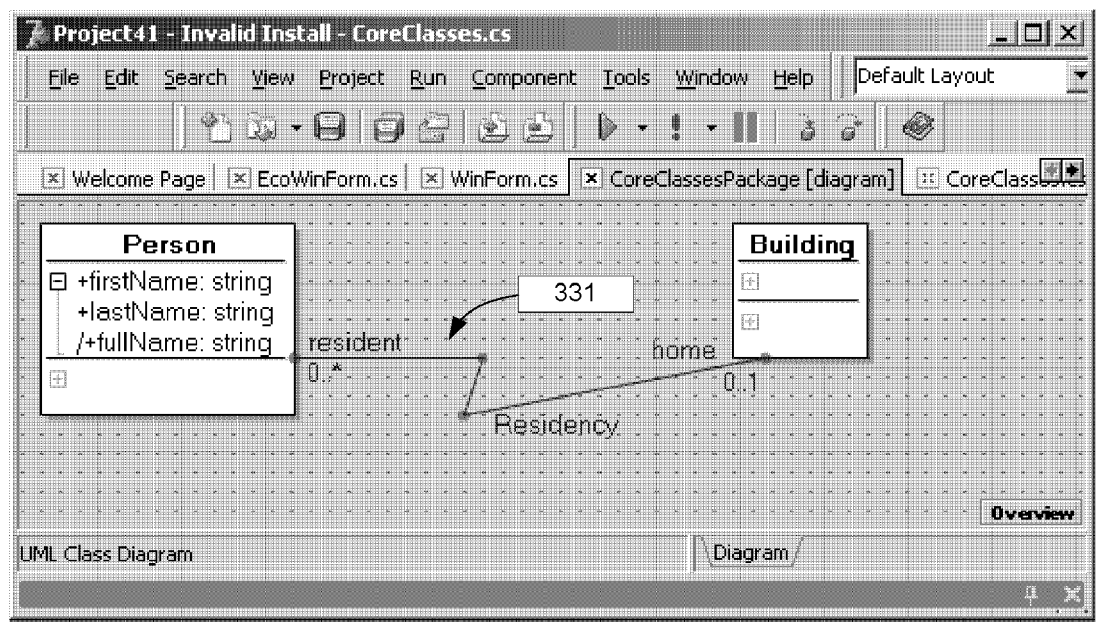

FIG. 3E shows the updated model with an association 331. Now the model includes an association Residency that links Person and Building, where Building has many residents and Person has either zero or one home. FIG. 3F now shows the updated code 333 which includes the association. The updated code 333 illustrates that the Package now contains information about the associations within the package (Residency). Additionally, one also obtains newly generated properties corresponding to the association ends: home and resident.

These properties are annotated or "decorated" with information required to convey their full UML meaning. The fact that they represent a UML element and the type of the element are both expressed in

[UmlElement("AssociationEnd", Index=(Person.PersonFirstMember+3))], the defining association class is defined in

[UmlMetaAttribute("association", typeof(CoreClassesPackage.Residency), Index=1)], and, finally, the multiplicity of the role in

[UmlMetaAttribute("multiplicity", "0 . . . 1")]

and

[UmlMetaAttribute("multiplicity", "0 . . . *")], respectively.

A key aspect of these attributes is that they convey information about the model ("meta information") that is impossible to express in normal structural coding elements. This meta information may then be used to recreate all important aspects of the model at application run time.

Code Generation/Interpretation Of Model Elements

General

In the currently preferred embodiment, a model is created based on the UML 1.3 "metamodel." Model information (such as UML meta attributes) that cannot be directly deduced from the code structure itself is represented with a special .NET attribute attached to the element. For example, the meta attribute "isAbstract" is defined on "GeneralizeableElement" as follows:

[UMLMetaAttribute("isAbstract", false)]

Tagged Values are represented similarly:

[UMLTaggedValue("tag", "value")]

Certain data types may require special handling. For example, "multiplicities" are handled as strings:

[UMLMetaAttribute("multiplicity", "0 . . . 1")]

Expressions are strings, that are OCL expressions:

[UMLMetaAttribute("initialValue", "'Peter'")]

For model elements that have no representation in the code, such as Associations, the attributes will be stored on an associated object.

Package

A package becomes a file with the name <packagename>.cs (e.g., using the C# extension). In that file, a class named <packagename> is defined for holding references (using attributes) to all the classes and other packages contained in that package.

Class

A class becomes a class in the source code (e.g., C# source code). It may implement, for example, an IContent interface:

```
1:  public class Person: Entity, IContent
2:  {
3:  // Entity being the superclass of person
    It includes a region where the generated code may be hid-
    den from the developer, if desired.
4:      #region Internal methods for connecting the class to
    the
    framework. DO NOT TOUCH!
```

This region contains:

```
1. Implementation of IContent:
(a) AsIObject:
  5:      public IObject AsIObject( )
  6:      {
  7:          return _content.AsIObject( );
  8:      }
(b) get__MemberByIndex:
  9:      public object gel_MemberByIndex(int index)
 10:      {
 11:          switch(index - _max_member_index_entity)
 12:          {
 13: // stuff generated per attribute, as described below
 14:              default:
 15:                  throw new Exception( );
 16:          }
 17:      }
(c) set__MemberByIndex:
 18:      public void set_MemberByIndex(int index, object value)
 19:      {
 20:          switch(index - _max_member_index_entity)
 21:          {
 22: // stuff generated per attribute, as described below
 23:              default:
 24:                  throw new Exception( );
 25:          }
 26:      }
2. A field _content:
 27:      protected IContent _content;
3. Methods, exactly as:
 28:      private void Initialize(IServiceProvider serviceProvider)
 29:      {
 30:          _content =
((IInternalObjectFactory)serviceProvider.GetService(typeof(
IInternalObjectFactory))).CreateObject(
UMLClass( ), this);
 31:      }
 32:      private void Initialize(IServiceProvider serviceProvider)
 33:      {
 34:          _content =
((IInternalObjectFactory)serviceProvider.GetService(typeof(
IInternalObjectFactory))).CreateObject(
UMLClass( ), this);
 35:      }
 36:
 37:      private void Deinitialize( )
 38:      {
 39:          if (_content != null)
 40:          {
 41:
((IInternalObjectFactory)_content.AsIObject( ).ServiceProvider(
).GetService(typeof(IInternalObjectFac-
tory))).CreateObjectFailed(_content, this);
 42:              _content = null;
 43:          }
 44:      }
4. A method and a field:
 45:      private static IClass myClass;
 46:      protected IClass UMLClass( )
 47:      {
 48:          if(myClass == null)
 49:          {
 50:              myClass = UMLModel.Class("Buildings_and_Owne
rs::Person");
 51:          }
 52:          return myClass;
 53:      }
``` where "Building_and_Owners::Person" is the fully qualified name of the class.

Furthermore, in the same .cs file as the class, there is a list interface typed for that class:

```
54: public interface IPersonList
55: {
56:     Person get_item(int Index);
57:     // etc...
58: }
``` where "// etc." corresponds to the methods declared on "IList", but typed as Person, instead of object.

A class implementing that interface, and IList:

```
59: public class BuildingListAdapter: IBuildingList, IList
60: {
61:     private IList adaptee;
62:     public BuildingListAdapter(IList source)
63:     {
64:         adaptee = source;
65:     }
66:
67:     public Building get_item(int Index)
68:     {
69:         return adaptee[Index] as Building;
70:     }
71:     // etc...
72: }
```

And finally a constant:
73: static protected int _max_member_index_person = _max_member_index_entity + 3;

where "entity" is the name of the superclass of person, and "3" is the number of members (i.e., attributes and navigable association ends) defined by the person class.

Attributes

Attributes in the model become properties of the class:

```
 1: public string Name
 2: {
 3:     get
 4:     {
 5:         // user code here
 6:         return _Name;
 7:     }
 8:     set
 9:     {
10:         // user code here
11:         _Name =value;
12:         // and here
13:     }
14: }
``` and properties in the "hidden" region of the class:

```
15: protected string _Name
16: {
17:     get
```

-continued

```
18:     {
19:         return
    _content.get_MemberByIndex(_max_member_index_entity
    + 1)
    as string;
20:     }
21:     set
22:     {
23:         _content.set_MemberByIndex(_max_member_index_entity +1,
    value);
24:     }
25: }
``` where the index "1" is a number such that the members defined on a class are enumerated 1 . . . nr of members.

Case statements are added to the get_MemberByIndex:

```
26:     case 1:
27:         return Name;
28: and to set_MemberByIndex
29:     case 1:
30:         Name = value as string;
31:         break;
``` with the index "1" again being the number enumerating that particular member.

Operation

Operations are generated as defined.

Constructor

Constructors are generated like:

```
1:  public Person(IServiceProvider serviceProvider): base( )
2:  {
3:      Initialize(serviceProvider);
4:      try
5:      {
6:          // user code here
7:      }
8:      catch
9:      {
10:         Deinitialize( );
11:     }
12: }
``` where "serviceProvider" is a parameter that is not in the model, but is added last in the parameter list. There is a tagged value on the operation called "AddServiceProviderParameter", having possible values "true" or "false", that controls if this parameter is added or not. The default value is true.

Association/Association End

Association ends are treated largely as attributes. An Association that ends with a multiplicity 1 or 0 . . . 1 is treated differently than one that ends with an upper multiplicity >1.

For a multiplicity 1, a property is defined:

```
1:  public Building Home
2:  {
3:      get
4:      {
5:          // user code here
6:          return _Home;
7:      }
8:      set
9:      {
10:         // user code here
11:         _Home = value;
12:         // and here
13:     }
14: }
``` where "Building" is the name of the referred class, and "Home" is the name of the Association end.

The "hidden" region includes:

```
1:  protected Building _Home
2:  {
3:      get
4:      {
5:          return _content.get_MemberByIndex(
    _max_member_index_entity + 2) as Building;
6:      }
7:      set
8:      {
9:          _content.set_MemberByIndex(_max_member_index_entity + 2, value);
10:     }
11: }
12: Case statements are added to the get_MemberByIndex
13:         case 1:
14:             return Home;
15: and to set_MemberByIndex
16:         case 1:
17:             Home = value as Building;
18:             break;
```

For an upper multiplicity >1, a property is defined:

```
1:  public IBuildingList OwnedBuildings
2:  {
3:      get
4:      {
5:          // possible user code here to create custom adapter. But preferably not.
6:          return new BuildingListAdapter(_OwnedBuildings);
7:      }
8:  }
9:  and in the "hidden" region:
10:     protected IList _OwnedBuildings
11:     {
12:         get
13:         {
14:             return _content.get_MemberByIndex(_max_member_index_entity + 3) as IList;
15:         }
16:     }
```

Restoring a Model at Run Time

Consider the following sample application included in the source code appendix filed herewith.

Given the code in the above-described sample application, the system of the present invention can recreate a full UML model at run time. At the outset, the packages making up the model for an application are compiled. This is done by an artificial model class that has the packages as attributes:

```
1:  namespace Project41
2:  {
3:      [EcoSpace]
```

-continued

```
4:     [EcoSpacePackage(typeof(Project41.CoreClassesPackage))]
5:     public class Project41EcoSpace:
Borland.Eco.Handles.DefaultEcoSpace
6:     //...
```

Creation of this class invokes the ReflectionReader that acts as an intermediate layer between what can be seen in the binary code (by means of introspection) and the full UML model. Of particular interest is the following:

```
1:  constructor TypeSystemHolder.Create(ecoSpaceType: System.Type);
2:  { variable declarations }
3:  begin
4:     inherited Create;
5:     fMoldModel := TMoldModel.Create(nil, name);
6:     r := ReflectionReader.Create;
7:     attrs := Attribute.GetCustomAttributes(ecoSpaceType,
typeof(EcoSpace PackageAttribute));
8:     i := 0 to Length(attrs) − 1 do
9:         r.read Package((attrs[i] as EcoSpacePackageAttribute).
Package, fMoldModel);
10: end;
```

Note that the participating packages are located and sent into the following ReflectionReader's ReadPackage method together with the structure that holds the completed UML model (an instance of TMoldModel):

```
1:  procedure ReflectionReader.ReadPackage(Package: System.Type;
Model: TMoldModel);
2:  var
3:     attrs: array of Attribute;
4:     i: integer;
5:     UMLAttr: UmlMetaAttributeAttribute;
6:     TV: UmlTaggedValueAttribute;
7:     nestedClasses: array of System.Type;
8:  begin
9:     // Find all classes nested in the package
10:    attrs := Attribute.GetCustomAttributes(Package,
typeof(UmlMetaAttributeAttribute));
11:    for i := 0 to Length(attrs)−1 do
12:    begin
13:       UMLAttr := UmlMetaAttributeAttribute(attrs[i]);
14:       if UMLAttr.Name = 'ownedElement' then // do not localize
15:          GetEnsuredClass(System.Type(UMLAttr.Value), Model)
16:       else
17:          ;
18:    end;
19:
20:    // Find all tagged values on package level
21:    attrs := Attribute.GetCustomAttributes(Package,
typeof(UmlTagged ValueAttribute));
22:    for i := 0 to Length(attrs)−1 do
23:    begin
24:       TV := UmlTaggedValueAttribute(attrs[i]);
25:       if TV.Tag = TAG_REGIONDEFINITIONS then
26:          Model.BoldTVByName[TAG_REGIONDEFINITIONS] :=
Model.BoldTVByName[TAG_REGIONDEFINITIONS] + TV.Value;
27:    end;
28:
29:    // loop through elements that have no natural representation in code
30:    nestedClasses := Package.GetNestedTypes;
31:    for i := 0 to Length(nestedClasses)−1 do
32:       EnsureElement(nestedClasses[i], Model);
33:    Model.LoopBackIndexesValid := true;
34:    end;
```

Here one can see the top of a "spanning" methodology or technique of the present invention. The method finds all classes contained in the package that are enumerated by code level attributes of the type UmlMetaAttribute. The classes are further analyzed by the GetEnsuredClass method. Tagged values (UML "additional information") are also located and the Model (TMoldModel instance) is further refined. Finally the classes nested within the package (notably association classes) are found and added to the UML model structure. The GetEnsuredClass method for analyzing classes is as follows:

```
1:  function ReflectionReader.GetEnsuredClass(c: System.Type; Model:
TMoldModel): TMoldClass;
2:
3:  var
4:     aClass: TMoldClass;
5:  begin
6:     aClass := Model.Classes.ItemsByName[c.Name];
7:     if not assigned(aClass) then
8:        if assigned(Attribute.GetCustomAttribute(c,
typeof(UmlElementAttribute))) then
9:           aClass := ConvertClass(c, Model);
10:    result := aClass;
11: end;
```

As shown, the GetEnsuredClass method is used to find the class at hand within the UML model structure if it has already been added, or to create the class in the case of a first encounter. In the latter case, the UML-related information about the class is restored in the Reflection-Reader's ConvertClass as follows:

```
1:  function ReflectionReader.ConvertClass(c: System.Type; Model:
TMoldModel): TMoldClass;
2:  var
3:     pi: array of PropertyInfo;
4:     aClass: TMoldClass;
5:     i: Integer;
6:     ElementAttr: UmlElementAttribute;
7:  Begin
8:     // Create a new UML class
9:     aClass := TMoldClass.Create(Model, c.Name);
10:
11:    // Extract the UML attributes
12:    ElementAttr := UmlElementAttribute(Attribute.GetCus-
tomAttribute
(c, typeof(UmlElementAttribute)));
13:    // Are we dealing with an associaton class?
14:    if assigned(ElementAttr) and (ElementAttr.MetaType =
'AssociationClass') then
15:       aClass.Association := GetEnsuredAssociation(c, Model);
16:
17:    // Convert generic base level UML stuff
18:    ConvertElement(c, aClass);
19:
20:    // Get the class level UML attributes
21:    ReadClassUML..Attributes(c, aClass);
22:
23:    // Get the remaining class level UML attributes
24:    // via reflection
25:    aClass.IsAbstract := c.IsAbstract;
26:    aClass.SuperClass := GetEnsuredClass(c.BaseType, Model);
27:    aClass.ObjectType := c;
28:
29:    // Construct the UML properties
30:    pi := c.GetProperties;
31:    for i := 0 to Length(pi)−1 do
32:    begin
33:       if assigned(Attribute.GetCustomAttribute(pi[i],
typeof(UmlElementAttribute))) then
34:          ConvertProperty(pi[i], aClass);
35:    end;
36:    result := aClass;
37: end;
```

Here a UML class is created by a combination of "normal" introspection and extracting information from code level attributes.

The UML properties of the class are extracted in the following ConvertProperty method:

```
1:  function ReflectionReader.ConvertProperty(p: PropertyInfo; aClass:
    TMoldClass): TMoldMember;
2:  var
3:     { variable definitions }
4:  begin
5:     IsRole := false;
6:     RelatedClass := GetEnsuredClass(p.PropertyType,
    aClass.Model);
7:     if not assigned(RelatedClass) then
8:     begin
9:        CollectionAttr :=
    UmlCollectionAt-
    tribute(Attribute.GetCustomAttribute(p.PropertyType,
    typeof(UmlCollectionAttribute)));
10:       if assigned(CollectionAttr) then
11:          RelatedClass := GetEnsuredClass(CollectionAttr.Element-
    Type, aClass.Model);
12:       if not assigned(RelatedClass) then
13:       begin
14:          ElementAttr :=
    UmlElementAttribute(Attribute.GetCustomAttribute(p,
    typeof(UmlElementAttribute)));
15:          IsRole := assigned(ElementAttr) and (ElementAttr.
    MetaType = 'AssociationEnd');
16:       end;
17:    end;
18:
19:    if assigned(RelatedClass) or IsRole then
20:    begin
21:       aRole := TMoldRole.Create(nil, p.Name);
22:       aRole.MoldClass := aClass;
23:       aRole.ReferredClass := RelatedClass;
24:       ConvertMember(p, aRole);
25:       ReadRoleUMLAttributes(p, aRole, aClass.Model);
26:       result := aRole;
27:    end
28:    else
29:    begin
30:       anAttr := TMoldAttribute.Create(aClass, p.Name);
31:       anAttr.BoxedType := p.PropertyType;
32:       ConvertMember(p, anAttr);
33:       anAttr.BoldType := p.PropertyType.FullName;
34:       ReadAttributeUML.Attributes(p, anAttr);
35:       result := anAttr;
36:    end;
37: end;
```

A property can either be a "leaf node", such as firstName or lastName, or a role (e.g. home, resident).

System Modules

Figure 4:
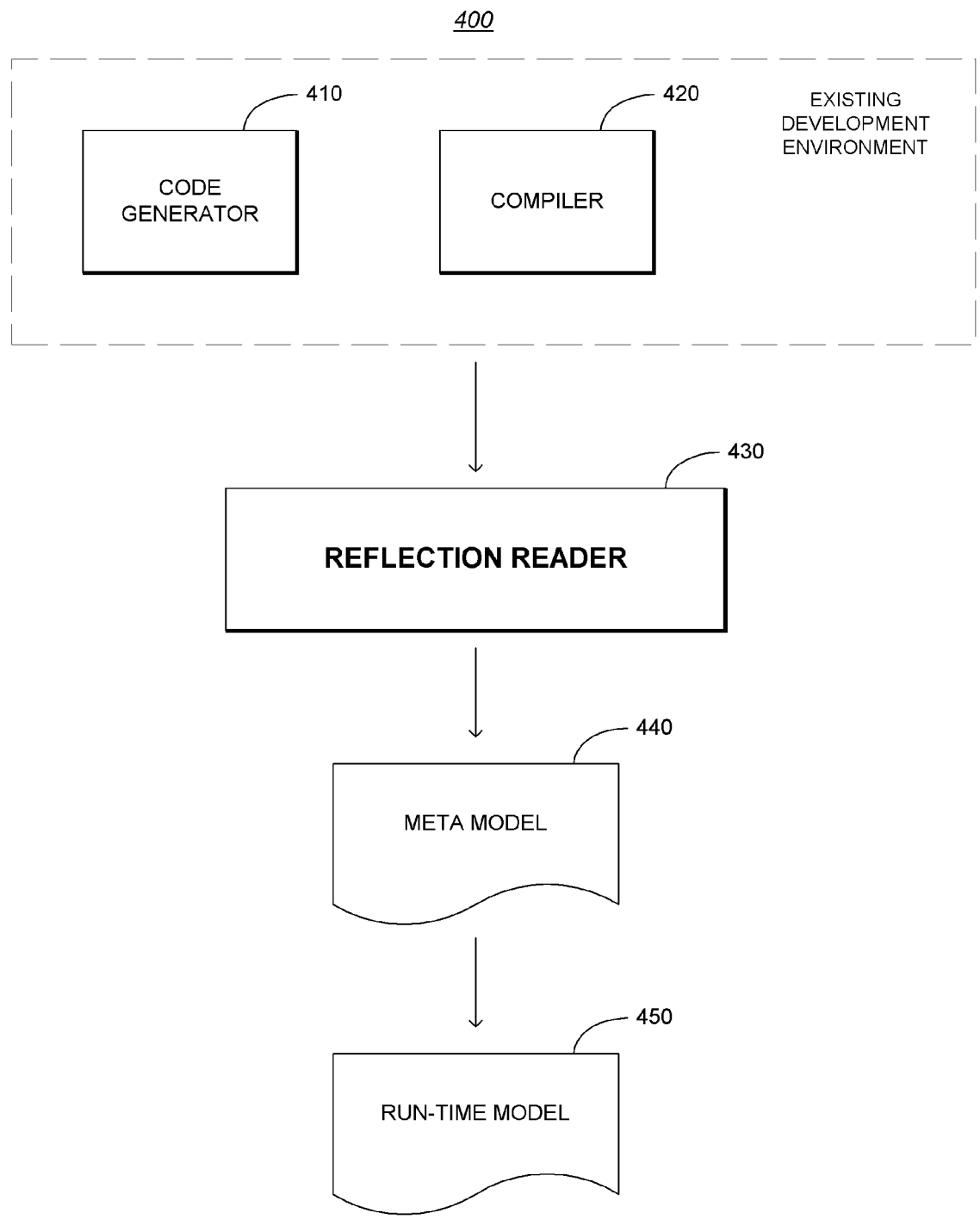
FIG. 4 is a high-level block diagram illustrating the main system modules.

FIG. 4 is a high-level block diagram illustrating the main system modules. As shown, the system 400 includes a code generator 410, a compiler 420, a reflection reader (Reflexion-Reader™) 430, a meta model 440, and a run-time model 450. These components will be described in turn.

The code generator 410 generates suitable code from operations performed on a design surface, and the compiler 420 generates binary code from the source code emitted from the code generator. Those may be implemented using conventional code generator and compiler modules from an existing development environment (e.g., Borland C++, Borland JBuilder®, Borland Delphi, and so forth). The reflection reader 430 is a new core module which collaborates with the code generator and compiler modules to provide the below-described methodologies of the present invention. The reflection reader 430 is essentially fed a top-level node representing "the model". With that input, the reflection reader 430 may span the entire model using a tree spanning algorithm. During this process, the information from the UML model (found in code structures and decorations or "attributes") is reconstructed to represent the meta model 440. In essence, the meta model 440 holds the model information as generated by the reflection reader 430. This model information is, in turn, fed to a run-time framework that processes the model (represented at run-time as "RTModel" 450). The run-time model is a cached/speed optimized version of the meta model 440, which is then used during application execution.

Detailed Operation

General

The following description presents method steps that may be implemented using computer-executable instructions, for directing operation of a device under processor control. The computer-executable instructions may be stored on a computer-readable medium, such as CD, DVD, flash memory, or the like. The computer-executable instructions may also be stored as a set of downloadable computer-executable instructions, for example, for down-loading and installation from an Internet location (e.g., Web server).

At code generation time (whether automatic, manual or semi-automatic) the information about a particular model element (e.g., a class, attribute, method, or the like) is added to the code element that the model element represents in the form of custom attributes. At run-time, when the model information is required (or at some appropriate time before that) the reflection reader reconstructs the model. Here, the reflection reader recreates for each code element (traversed using reflection) the corresponding appropriate model element. This mapping between code elements and model elements is sometimes straightforward, such as when a code class corresponds to a class in the model. At other times, however the mapping is more complicated. A property in code may be either an attribute in the model, or an association end, identified by certain custom attributes. Therefore, more complicated mappings may result, such as when a code class is identified as corresponding to a package in the model through the custom attribute [UmlMetaclass("package")].

Overall operation

Figure 5A:
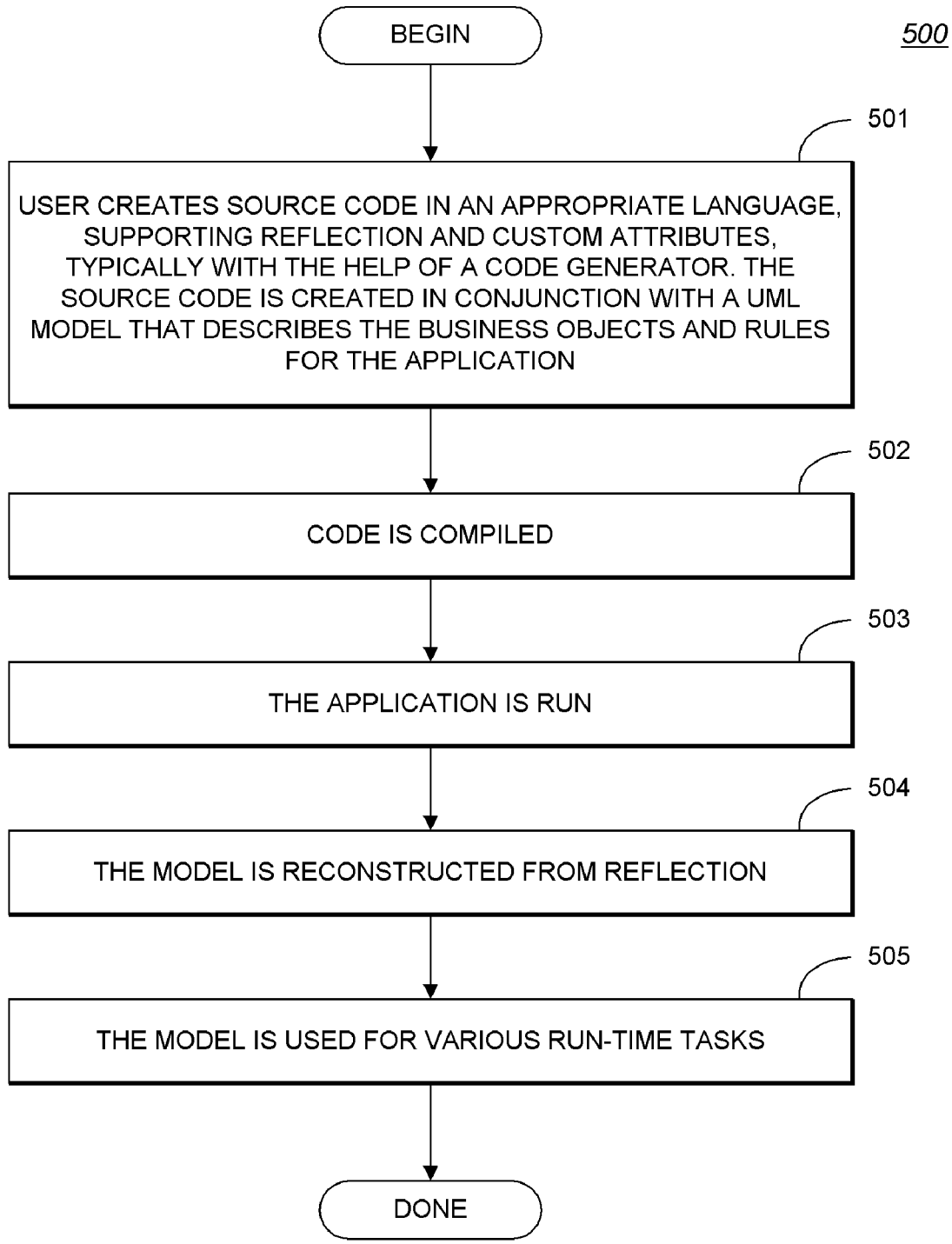
FIGS. 5A-C comprise high-level flowcharts illustrating overall operation of the system of the present invention.
Figure 5B:
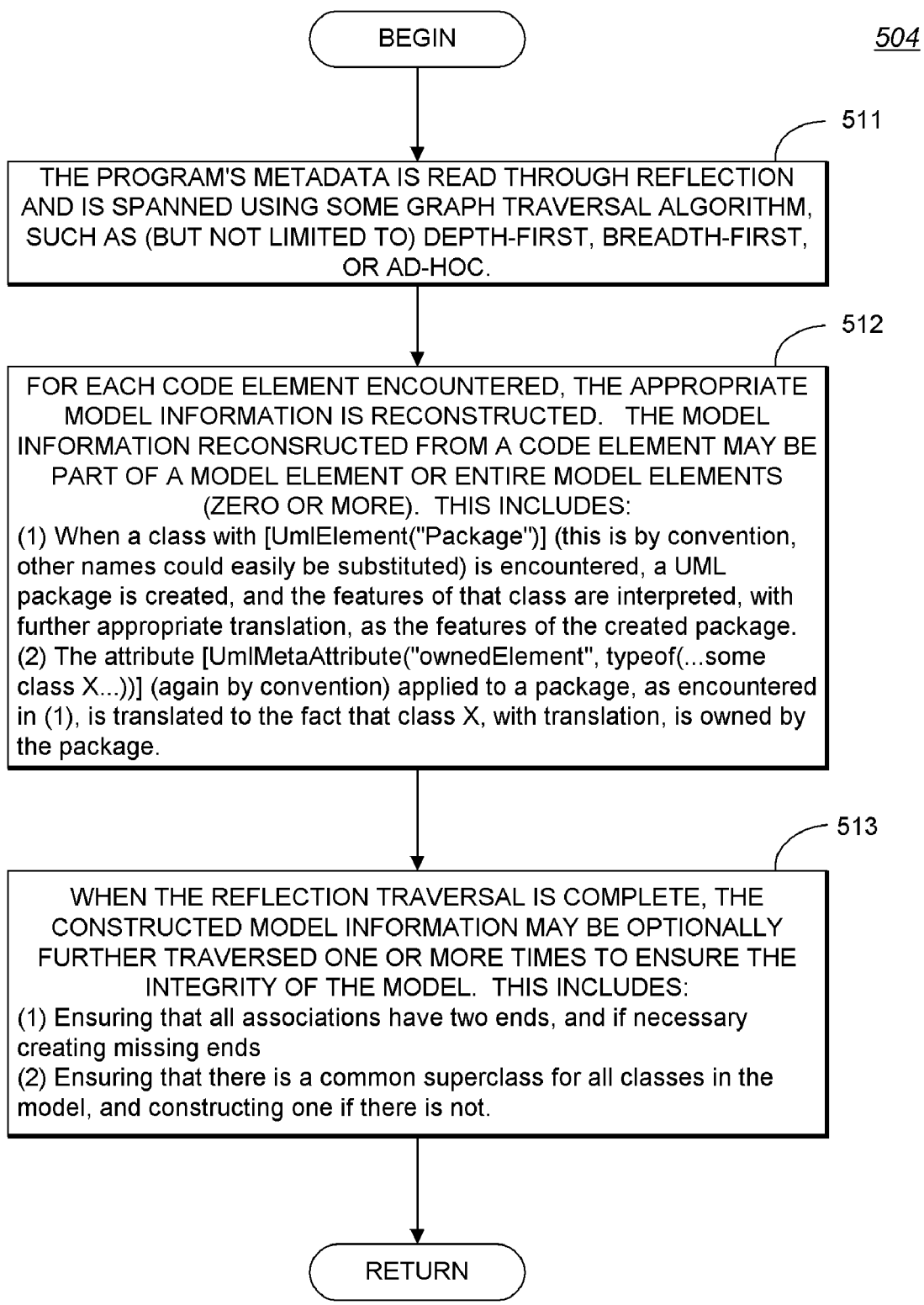
Figure 5C:
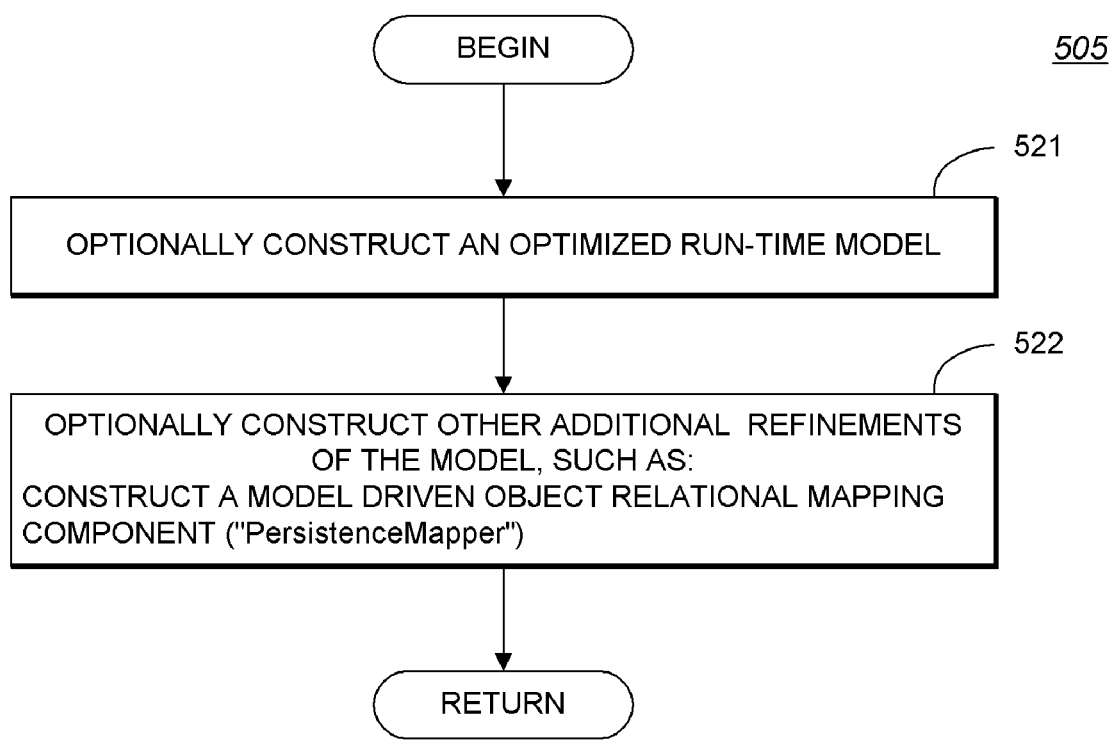

FIGS. 5A-C comprise high-level flowcharts illustrating overall operation of the system of the present invention. First, as shown at step 501, the user creates source code in an appropriate language (e.g., Java, C#, or Delphi Pascal) which supports reflection and custom attributes, typically with the help of a code generator. The source code is created in conjunction with a UML model that describes the business objects and rules for the application and, in accordance with the present invention, the model is expressed in the source code. Now, the code is compiled, as shown at step 502. The output of this step is a compiled application. The application may now be run or executed on a target machine, as indicated by step 503. During this run-time execution, the model is reconstructed from reflection, as indicated by step 504. As a result, the run-time environment now has full access to the model and therefore may use the model for various run-time tasks, as indicated by step 505.

FIG. 5B illustrates the process of reconstructing the model from reflection (step 504 above) in greater detail. At step 511, the application program's metadata is read through reflection and is spanned. The spanning may be performed using a conventional graph traversal methodology, including (but not limited to) depth-first, breadth-first, or ad-hoc. As shown at step 512, for each code element encountered, the appropriate model information is reconstructed. The model information recontructed from a code element may be part of a model element or entire model elements (zero or more). This process includes substeps of:

(1) When a class with [UmlElement("Package")] (this is by convention, other names could easily be substituted) is encountered, a UML package is created, and the features of that class are interpreted, with further appropriate translation, as the features of the created package.

(2) The attribute [UmlMetaAttribute("ownedElement", typeof(... some class X ... ))] (again by convention) applied to a package, as encountered in (1), is translated to the fact that class X, with translation, is owned by the package.

As shown at step 513, when the reflection traversal is complete, the constructed model information may be optionally further traversed one or more times to ensure the integrity of the model. This may include (but not limited to) substeps of:

(1) Ensuring that all associations have two ends, and if necessary creating missing ends.

(2) Ensuring that there is a common superclass for all classes in the model, and constructing one if there is not.

FIG. 5C illustrates how the model may be used for various run-time tasks. As indicated by step 521, the system may optionally construct an optimized run-time model. The model may reside in cache memory. Further, the system may optionally construct further refinements of the model, such as constructing a model driven Object Relational Mapping component (PersistenceMapper), as indicated by step 522.

Reflection Operation

Reflection is performed by the reflection reader. Its internal operation may be described by way of pseudocode.

(1) Reading Packages

The following pseudocode demonstrates the method steps that the reflection reader follows to read packages (code modules):

```
1:  Procedure ReadPackage(package, metaModel);
2:  {
3:    for each ownedElement:Class in package
4:      GetEnsuredClass(ownedElement, metaModel)
5:    for each attribute:Tagged Value in package
6:      metaModel.SetTaggedValue(attribute)
7:    for each nestedClass: UMLPackage in package
8:      ReadPackage(nestedClass, metaModel)
9:  }
```

As shown by the code, at this point the reader simply loops through each owned element, attribute, and nested class.

(2) Finding/Converting Classes

The following pseudocode illustrates the method steps that the reflection reader follows to find corresponding classes from the meta model:

```
1:  Procedure GetEnsuredClass(class, metaModel);
2:  {
3:    c <= metaModel.FindClass(class.Name)
4:    if !c &&c.IsUMLClass
5:      c <= ConvertClass(class, metaModel);
6:  }
```

As shown, the operation involves invoking a "FindClass" method on the meta model to return a class in the meta model for a given class name (line 3). If the returned class is not itself an UML class (tested at line 4), the reflection reader converts the real class into a compatible UML class data structure (corresponding to a meta model class) using a "Convert-Class" helper function, as shown at line 5.

The "Convert Class" helper function itself may be embodied as follows:

```
1:  Procedure ConvertClass(class, metaModel);
2:  {
3:    umlClass <= metaModel.CreateClass(class.Name);
4:    if class.Attribute[IsAssociationClass]
5:      umlClass.Association <= GetEnsuredAssociation(class,
6:  metaModel);
7:    SetUMLAttributes(umlClass, class.Attributes);
8:    umlClass.IsAbstract := class.IsAbstract;
9:    for each property in class.Properties
10:     AddProperty(umlClass, property);
11: }
```

As shown at line 3, the helper function invokes a "CreateClass" method on the meta model to create a corresponding UML class (structure) based on the passed-in (real) class. At lines 4-7, the function sets UML attributes for corresponding class attributes that exist. Finally, at lines 9-10, the helper function adds properties to the UML class, based on corresponding properties from the real class.

The process of adding properties is performed by an "AddProperty" helper function. It may be embodied as follows:

```
1:  Procedure AddProperty(umlClass, property);
2:  {
3:    isRole = property.Attributes['AssociationEnd'];
4:    if isRole
5:      umlRole <= umlClass.Model.CreateRole(property.Name);
6:      relatedClass <=
7:  GetEnsuredClass(property.Attribute[UmlRelatedClass])
8:      ReadRoleUMLAttributes(umlRole, property.Attributes,
9:    umlClass.Model);
10:   else
11:     umlProperty <=
12: umlClass.Model.CreateProperty(property.Name);
13:     ReadPropertyUMLAttributes(umlProperty,
14: property.Attributes, umlClass.Model);
15: }
```

As shown, the helper function is invoked with a given UML class and property. If the given property is an "Association-End" (tested at line 3), then the Boolean "is Role" is set to true. In that case, additional processing is required. The function will use the name of the property to resolve a UML role, before setting the property. Otherwise, the function may simply create the property by reading UML attributes. Here, some information can be extracted from "normal" introspection information, while other information can only be obtained by peeking at the carefully designed and attached .NET attributes.

While the invention is described in some detail with specific reference to a single-preferred embodiment and certain alternatives, there is no intent to limit the invention to that particular embodiment or those specific alternatives. For instance, the currently preferred embodiment is implemented using the Microsoft .NET framework, however those skilled in the art will appreciate that the present invention is suitable for embodiment in any combination of language/platform that allows introspection and amending structural code elements with arbitrary information. Therefore, those skilled in the art will appreciate that modifications may be made to the preferred embodiment without departing from the teachings of the present invention.

What is claimed is:

1. In a computer system, an improved method for developing and executing an application, the improved method comprising:
   creating a model describing business objects and rules of the application;
   creating source code for the application, including representing the model within the source code of the application itself, wherein the model is represented as source code and code attributes;
   compiling the source code into an executable application;
   running the executable application on a target computer in conjunction with a run-time framework that provides services to the executable application; and
   while the executable application is running, reconstructing the model from the representation incorporated into the executable application and making it available to the run-time framework, including reading metadata incorporated into the executable application using reflection to create a graph of code elements and spanning the graph for re-creating the model based on code elements encountered.

2. The improved method of claim 1, wherein the model comprises a Unified Modeling Language (UML) model.

3. The improved method of claim 1, wherein the source code is created using a programming language.

4. The improved method of claim 3, wherein the programming language is an object oriented programming language.

5. The improved method of claim 3, wherein the programming language is one that supports reflection technique, thereby allowing reconstruction of the model at run-time from the executable application.

6. The improved method of claim 1, wherein the reconstructed model is employed at run-time to support services that the run-time framework provides to the executable application.

7. The improved method of claim 1, wherein the spanning step includes:
   as each code element is encountered, reconstructing a corresponding portion of the model.

8. The improved method of claim 1, wherein the spanning step includes traversing the graph using a selected one of depth-first, breadth-first, and ad-hoc traversal techniques.

9. The improved method of claim 1, wherein the reconstructing step includes:
   detecting a class having a package element; and
   creating a corresponding Unified Modeling Language (UML) package for the reconstructed model.

10. The improved method of claim 9, further comprising:
   detecting an attribute specifying that a class belongs to the UML package; and
   specifying in the reconstructed model that the class belongs to that UML package.

11. The improved method of claim 1, further comprising:
   after reconstructing the model at run-time, testing integrity of the reconstructed model.

12. The improved method of claim 11, further comprising:
   ensuring that all classes in the model belong to a common superclass.

13. The improved method of claim 12, further comprising:
   if all classes in the reconstructed model do not share a common superclass, automatically constructing a common superclass for those classes.

14. The improved method of claim 1, wherein the reconstructed model is stored in a cache memory available to the run-time framework.

15. The improved method of claim 1, wherein the model is initially created using a modeling tool, and wherein the source code is compiled using a compiler.

16. The improved method of claim 1, wherein the step of creating source code includes:
   representing information of the model in source code as language constructs.

17. The improved method of claim 1, wherein the step of creating source code includes:
   representing information of the model in source code as attributes.

18. The improved method of claim 17, wherein attributes comprise specifiers to structural code elements.

19. The improved method of claim 1, wherein the step of creating source code includes:
   representing information of the model in code artifacts that exist expressly for carrying model information in source code.

20. A computer-readable medium storing processor-executable instructions for performing the improved method of claim 1.

21. A downloadable set of processor-executable instructions for performing the improved method of claim 1 stored on a computer-readable medium.

22. In a computer system, an improved system for developing and executing an application, the improved system comprising:
   a computer system having a processor and memory;
   a modeling tool for creating a model describing business objects and rules of the application;
   a module for creating source code for the application and representing the model within the source code of the application itself, wherein the model is represented as source code and code attributes;
   a compiler for compiling the source code into an executable application; and
   a run-time framework that is able to, while the executable application is running, reconstruct the model from the representation incorporated into the executable application and use it for providing services, including reading metadata incorporated into the executable application using reflection to create a graph of code elements and spanning the graph for recreating the model based on code elements encountered.

23. The improved system of claim 22, wherein the model comprises a Unified Modeling Language (UML) model.

24. The improved system of claim 22, wherein the source code is created using a programming language.

25. The improved system of claim 24, wherein the programming language is an object oriented programming language.

26. The improved system of claim 24, wherein the programming language is one that supports reflection technique, thereby allowing reconstruction of the model at run-time from the executable application.

27. The improved system of claim 22, wherein the reconstructed model is employed at run-time to support services that the run-time framework provides to the executable application.

28. The improved system of claim 22, wherein the submodule for spanning is able to reconstruct portions of the model based on corresponding code elements encountered in the executable application.

29. The improved system of claim 22, wherein the submodule for spanning is able to traverse the graph using a selected one of depth-first, breadth-first, and ad-hoc traversal techniques.

30. The improved system of claim 22, wherein the run-time framework includes submodules for detecting a class having a package element, and for creating a corresponding Unified Modeling Language (UML) package for the reconstructed model.

31. The improved system of claim 30, further comprising:
a module for detecting an attribute specifying that a class belongs to the UML package, and for specifying in the reconstructed model that the class belongs to that UML package.

32. The improved system of claim 22, further comprising:
a submodule for testing integrity of the reconstructed model.

33. The improved system of claim 32, further comprising:
a submodule for ensuring that all classes in the model belong to a common superclass.

34. The improved system of claim 33, further comprising:
a submodule for automatically constructing a common superclass for those classes when all classes in the reconstructed model do not share a common superclass.

35. The improved system of claim 22, wherein the reconstructed model is stored in a cache memory available to the run-time framework.

36. The improved system of claim 22, wherein the model is initially created using a UML modeling tool, and wherein the source code is compiled using a C# compiler.

37. The improved system of claim 22, wherein the module for creating source code is able to represent information of the model in source code as language constructs.

38. The improved system of claim 22, wherein the module for creating source code is able to represent information of the model in source code as attributes.

39. The improved system of claim 38, wherein attributes comprise specifiers to structural code elements.

40. The improved system of claim 22, wherein the module for creating source code is able to represent information of the model in code artifacts that exist expressly for carrying model information in source code.

41. A method for developing and executing an application on a computer system, the method comprising:
creating a model for developing an application using Unified Modeling Language (UML) technique;
generating source code of the application to implement the model;
amending the source code of the application for storing model information in the source code of the application itself as source code and code attributes;
compiling the amended source code into an executable application and running the executable application on the computer system;
while the executable application is running, reconstructing the model from the model information incorporated into the executable application, including reading metadata incorporated into the executable application using reflection to create a graph of code elements and spanning the graph for re-creating the model based on code elements encountered; and
making the reconstructed model available for supporting operation of the executable application, including rendering the reconstructed model for display.

42. The method of claim 41, wherein the source code is implemented using a programming language.

43. The method of claim 42, wherein the programming language is an object oriented programming language.

44. The method of claim 43, wherein the object oriented programming language is one that supports reflection technique, thereby allowing reconstruction of the model from the executable application.

45. The method of claim 41, wherein the reconstructed model is employed by a run-time framework to provide services to the executable application.

46. The method of claim 41, wherein the spanning step includes:
as each code element is encountered, reconstructing a corresponding portion of the model.

47. The method of claim 41, wherein the spanning step includes traversing the graph using a selected one of depth-first, breadth-first, and ad-hoc traversal techniques.

48. The method of claim 41, wherein the reconstructing step includes:
detecting a class having a package element; and
creating a corresponding Unified Modeling Language (UML) package for the reconstructed model.

49. The method of claim 48, further comprising:
detecting an attribute specifying that a class belongs to the UML package; and
specifying in the reconstructed model that the class belongs to that UML package.

50. The method of claim 41, further comprising:
after reconstructing the model, testing integrity of the reconstructed model.

51. The method of claim 50, further comprising:
ensuring that all classes in the model belong to a common superclass.

52. The method of claim 51, further comprising:
if all classes in the reconstructed model do not share a common superclass, automatically constructing a common superclass for those classes.

53. The method of claim 41, wherein the reconstructed model is stored in a cache memory.

54. The method of claim 41, wherein the model is initially created using a modeling tool, and wherein the amended source code is compiled using a compiler.

55. The method of claim 41, wherein the step of amending the source code includes:
representing information of the model in source code as language constructs.

56. The method of claim 41, wherein the step of amending the source code includes:
representing information of the model in source code as attributes.

57. The method of claim 56, wherein attributes comprise specifiers to structural code elements.

58. The method of claim 41, wherein the step of amending the source code includes:
representing information of the model in code artifacts that exist expressly for carrying model information in source code.

59. A computer-readable medium storing processor-executable instructions for performing the method of claim 41.

60. A downloadable set of processor-executable instructions for performing the method of claim 41 stored on a computer-readable medium.

* * * * *